United States Patent
Chen et al.

(10) Patent No.: US 12,223,626 B2
(45) Date of Patent: Feb. 11, 2025

(54) METHOD FOR DENOISING IMAGE, APPARATUS, AND COMPUTER-READABLE STORAGE MEDIUM

(71) Applicant: SHENZHEN INSTITUTES OF ADVANCED TECHNOLOGY, Shenzhen (CN)

(72) Inventors: Rongliang Chen, Shenzhen (CN); Xiaochuan Cai, Shenzhen (CN)

(73) Assignee: SHENZHEN INSTITUTES OF ADVANCED TECHNOLOGY, Shenzhen (CN)

( * ) Notice: Subject to any disclaimer, the term of this patent is extended or adjusted under 35 U.S.C. 154(b) by 362 days.

(21) Appl. No.: 17/732,577

(22) Filed: Apr. 29, 2022

(65) Prior Publication Data

US 2022/0253985 A1  Aug. 11, 2022

Related U.S. Application Data

(63) Continuation of application No. PCT/CN2019/114761, filed on Oct. 31, 2019.

(51) Int. Cl.
*G06T 5/70* (2024.01)
*G06T 5/50* (2006.01)

(52) U.S. Cl.
CPC ............... *G06T 5/70* (2024.01); *G06T 5/50* (2013.01); *G06T 2207/20021* (2013.01)

(58) Field of Classification Search
CPC .... G06T 5/70; G06T 5/50; G06T 2207/20021
See application file for complete search history.

(56) References Cited

U.S. PATENT DOCUMENTS

| | | | | |
|---|---|---|---|---|
| 2016/0071245 A1* | 3/2016 | Bergner | ................. | G06T 5/70 382/131 |
| 2016/0140725 A1* | 5/2016 | Bergner | ................. | G06T 7/13 382/173 |
| 2018/0033156 A1* | 2/2018 | Lee | ................. | G06T 5/70 |

FOREIGN PATENT DOCUMENTS

| | | | | |
|---|---|---|---|---|
| CN | 102903087 A | | 1/2013 | |
| CN | 105069764 A | * | 11/2015 | |
| CN | 106023204 A | | 10/2016 | |
| CN | 106683108 A | | 5/2017 | |
| CN | 107784631 A | * | 3/2018 | ............. G06T 5/003 |

(Continued)

OTHER PUBLICATIONS

Parallel domain decomposition based algorithm for large scale color image denoising dated 2014 (Year: 2014).*

(Continued)

*Primary Examiner* — Nizar N Sivji

(57) ABSTRACT

A method for denoising an image, an apparatus, and a computer-readable storage medium. The method includes: dividing a to-be-processed image into a plurality of image areas; for each image area, expanding an edge of the image area to obtain an expanded area; wherein the expanded area comprises the image area and an edge area, and the edge area comprises pixels in another image area adjacent to the image area; for each expanded area, performing denoising processing on the expanded area through a preset algorithm to obtain a denoised expanded area; wherein the denoised expanded area comprises a denoised image area and a denoised edge area; and abandoning the denoised edge area in each denoised expanded area, and retaining and combining all the denoised image areas to form a denoised image.

20 Claims, 4 Drawing Sheets

(56) References Cited

FOREIGN PATENT DOCUMENTS

| CN | 109377450 A | * | 2/2019 | ............. G06T 5/002 |
| CN | 110349112 A | * | 10/2019 | ............. G06T 5/002 |
| CN | 109242797 B | * | 10/2021 | ............. G06T 5/002 |
| WO | WO2012004764 A1 | | 1/2012 | |
| WO | WO-2018099136 A1 | * | 6/2018 | ............. G06T 5/00 |

OTHER PUBLICATIONS

Image Denoising Method Based on Non-uniform Partition and Wavelet Transform—2010 (Year: 2010).*
A Bayes Thresholding Method Based on Edge Protection Strategies—2011 (Year: 2011).*
Research of Image Denoising Based on Edge Preservation—2008 (Year: 2008).*
Non-Local means image denoising algorithm based on edge detection—2014 (Year: 2014).*
International search report, Application No. PCT/CN2019/114761, mailed Jul. 31, 2020.
Chinese First Office Action, Chinese Application No. 201911058893.4, mailed Feb. 10, 2023 (13 pages).
Chinese second Office Action, Chinese Application No. 201911058893.4, mailed Mar. 15, 2023 (13 pages).
Notification to Grant Patent Right for Invention, Chinese Application No. 201911058893.4, mailed Mar. 26, 2023 (4 pages).

* cited by examiner

METHOD FOR DENOISING IMAGE, APPARATUS, AND COMPUTER-READABLE STORAGE MEDIUM

CROSS REFERENCE

The present application is a continuation-application of International (PCT) Patent Application No. PCT/CN2019/114761, filed on Oct. 31, 2019, the entire contents of which are hereby incorporated by reference in its entirety.

TECHNICAL FIELD

The present disclosure relates to the field of image processing technologies, and in particular to a method for denoising an image, an apparatus, and a computer-readable storage medium.

BACKGROUND

In daily life, image processing technology has been applied to all aspects of human life, such as mobile phone terminal shooting, image display on the display, image denoising analysis in medical aviation and other fields. Among them, image denoising techniques are also applied in many important fields, and how to achieve denoising with fidelity is called the focus of research.

Current image denoising techniques require complex iterative algorithms for implementation, with complicated computational processes, more computational resources required, and longer computational times.

SUMMARY OF THE DISCLOSURE

The present disclosure provides a method for denoising an image, an apparatus, and a computer-readable storage medium.

To solve the above technical problem, the present disclosure provides a method for denoising an image, comprising: dividing a to-be-processed image into a plurality of image areas; for each image area, expanding an edge of the image area to obtain an expanded area; wherein the expanded area comprises the image area and an edge area, and the edge area comprises pixels in another image area adjacent to the image area; for each expanded area, performing denoising processing on the expanded area through a preset algorithm to obtain a denoised expanded area; wherein the denoised expanded area comprises a denoised image area and a denoised edge area; and abandoning the denoised edge area in each denoised expanded area, and retaining and combining all the denoised image areas to form a denoised image.

In some embodiments, for each image area, the expanding an edge of the image area to obtain an expanded area comprises: expanding the image area along an edge shape of the image area to obtain the expanded area with the same shape as the image area.

In some embodiments, the expanding the image area along an edge shape of the image area comprises: expanding the edge of the image area with a preset number of pixels along the edge shape of the image area; wherein the preset number is greater than or equal to 1.

In some embodiments, the dividing a to-be-processed image into a plurality of image areas comprises: equally dividing the to-be-processed image into the plurality of image areas each in a rectangular shape.

In some embodiments, in condition of the to-be-processed image being a three-dimensional image, the dividing a to-be-processed image into a plurality of image areas comprises: dividing the to-be-processed image into the plurality of image areas according to three-dimensional coordinates of the to-be-processed image; wherein each image area is three-dimensional.

In some embodiments, for each expanded area, the performing denoising processing on the expanded area through a preset algorithm comprises: establishing an image denoising Rudin-Osher-Fatemi (ROF) model for the expanded area, and solving a Euler-Lagrange equation for the image denoising ROF model to denoise the expanded area; wherein the Euler-Lagrange equation of the image denoising ROF model is as followed:

$$\begin{cases} u^k - z^k - \alpha \nabla \cdot \left( \dfrac{\nabla u^k}{\sqrt{|\nabla u^k|^2 + \beta}} \right) = 0, & \text{in } \Omega_\delta^k, \\ \dfrac{\partial u^k}{\partial n} = 0, & \text{on } \partial \Omega_\delta^k, \end{cases}$$

where $u^k$ is a pixel value of a k-th denoised image area, $z^k$ is a pixel value of a k-th image area, $\Omega_\delta^k$ is a k-th expanded area, and n is an outer normal vector of a corresponding image area; k is greater than or equal to 1 and less than or equal to n; $\alpha$ and $\beta$ are preset parameters.

In some embodiments, values of $\alpha$ and $\beta$ depend on a desired denoising degree; the greater the desired denoising degree, the less the values of $\alpha$ and $\beta$.

In some embodiments, for each expanded area, the performing denoising processing on the expanded area through a preset algorithm comprises: applying a Newton-Krylov-Schwarz (NKS) algorithm to denoise the expanded area.

To solve the above technical problem, the present disclosure further provides an apparatus for denoising an image, comprising a memory, a processor, and a computer program stored in the memory and executable by the processor; wherein the processor is capable of executing the computer program to implement operations of the method as described above.

To solve the above technical problem, the present disclosure further provides a computer-readable storage medium, storing a computer program; wherein the computer program is executable by a processor to implement operations of the method as described above.

DETAILED DESCRIPTION

In order to enable those skilled in the art to better understand the technical solutions of the present disclosure, an image denoising method, an image denoising apparatus, and a computer-readable storage medium provided by the present disclosure are described in further detail below in conjunction with the accompanying drawings and specific embodiments.

The image denoising method of the present disclosure is particularly suitable for large-scale images. In the method of the present disclosure, a to-be-processed image is first divided into a plurality of image areas to perform denoising processing on each image area, thereby reducing the calculation scale. In addition, it is found in the present disclosure that when directly denoising a divided image area, since there are no associated pixels around pixels at an edge of the image to refer to for denoising, the denoising effect is not good. In the present disclosure, the image is expanded and then denoised. In this case, the pixels at the edges are expanded pixels, and the pixels at the original edges are now located inside the expanded area, such that the denoising effect of the pixels at the original edges may be ensured. After completing the calculation, the denoising result at the expanded edges is discarded, i.e., the part with better denoising effect is retained and the image is reconstructed based thereon. The present disclosure ensures the denoising effect of the whole image by the above method.

Figure 1:
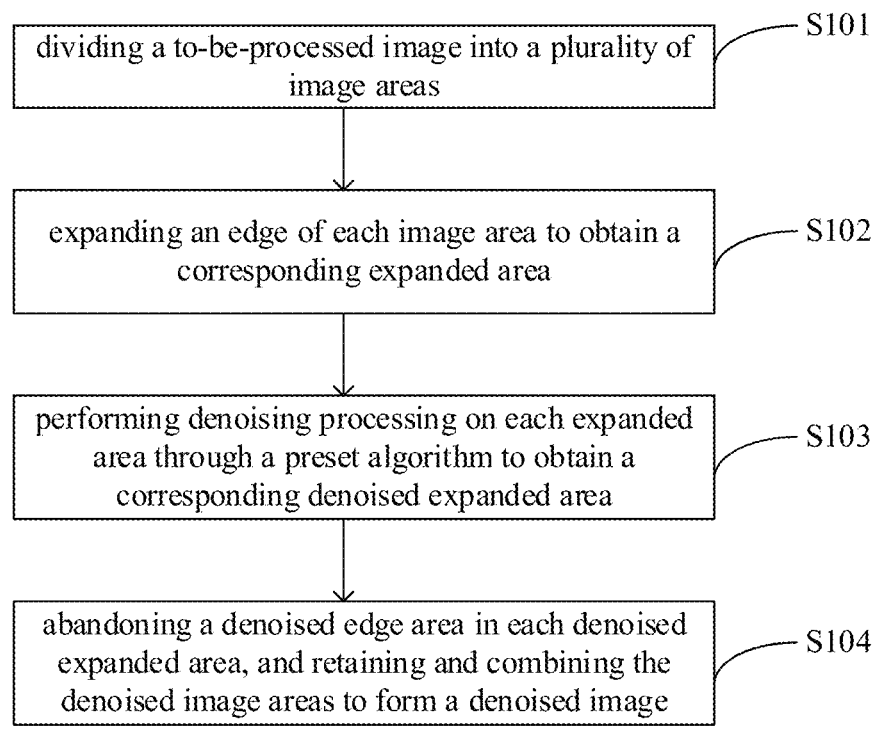
FIG. 1 is a flowchart of a method for denoising an image according to an embodiment of the present disclosure.

Referring to FIG. 1, FIG. 1 is a flowchart of a method for denoising an image according to an embodiment of the present disclosure. The method includes operations at blocks illustrated therein.

At block S101: dividing a to-be-processed image into a plurality of image areas.

In the present disclosure, the to-be-processed image is first divided into multiple image areas, and different processors may be applied to implement parallel calculation of the multiple image areas.

Figure 2:
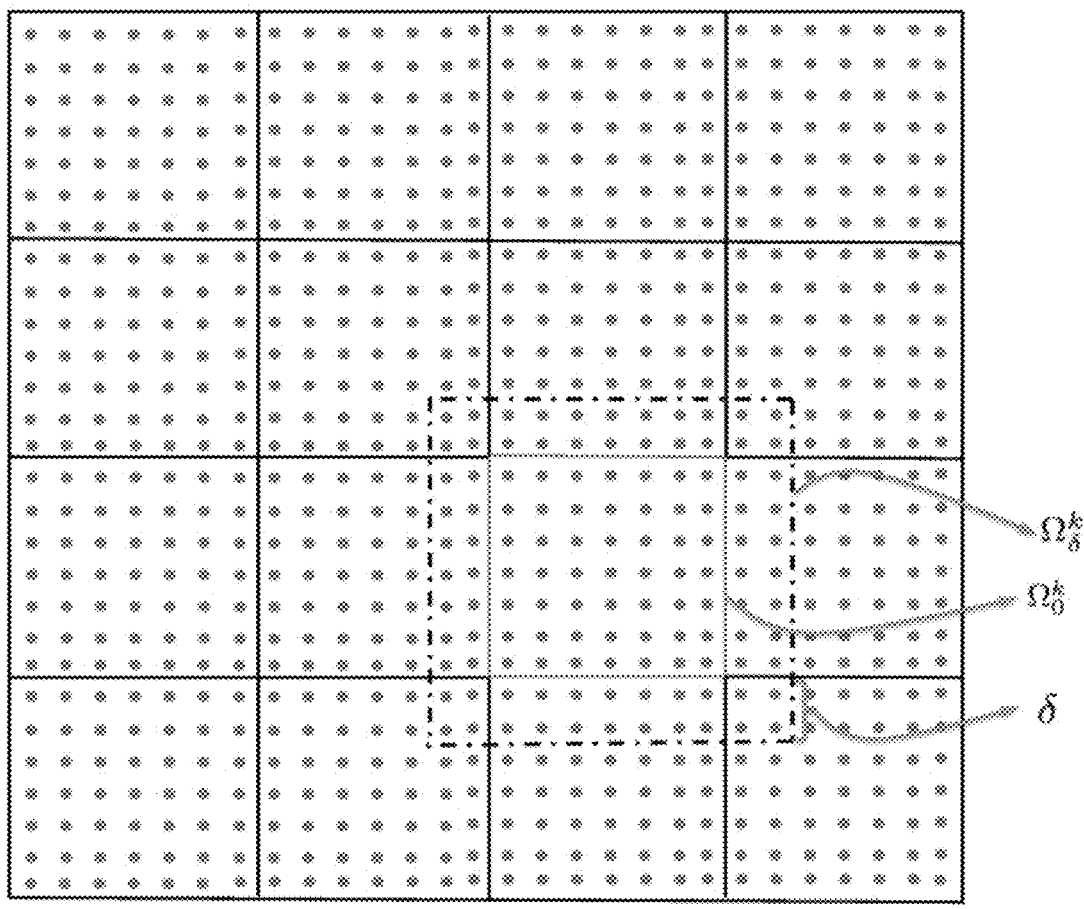
FIG. 2 is an expanded schematic view of an image area in the embodiment shown in FIG. 1.

When the to-be-processed image is a two-dimensional image, the to-be-processed image may be equally divided into multiple rectangular image areas, which may facilitate calculation and equalize the calculation burden, improving the overall calculation efficiency. As shown in FIG. 2, FIG. 2 is an expanded schematic view of an image area in the embodiment shown in FIG. 1. The to-be-processed image in FIG. 2 is divided into multiple image areas $\Omega_0^k$.

Figure 3:
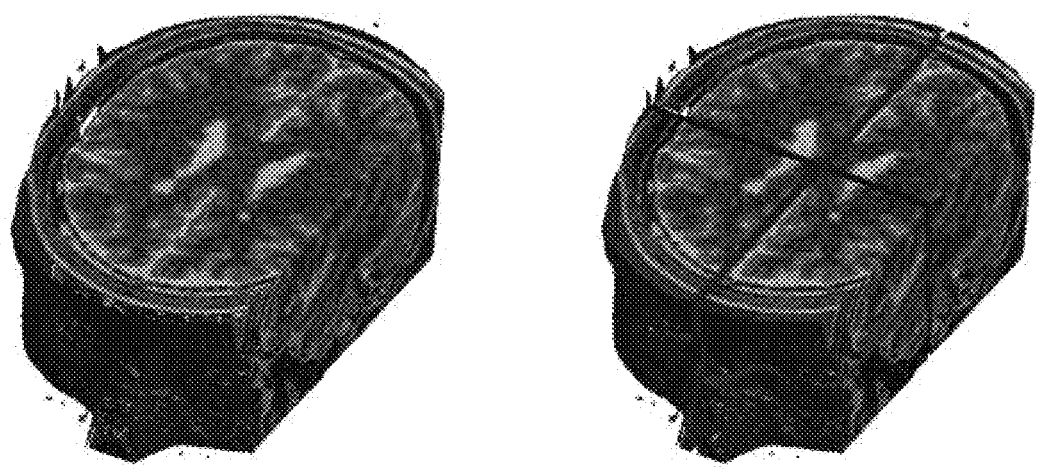
FIG. 3 is a schematic view of an image area division of a three-dimensional image in the embodiment shown in FIG. 1.

When the to-be-processed image is a three-dimensional image, during the dividing process of the three-dimensional image, the to-be-processed image is divided into multiple three-dimensional image areas according to three-dimensional coordinates of the to-be-processed image. As shown in FIG. 3, FIG. 3 is a schematic view of an image area division of a three-dimensional image in the embodiment shown in FIG. 1. The three-dimensional to-be-processed image is divided along three mutually perpendicular axes, so as to obtain divided three-dimensional image areas. Different from a calculation method in which a three-dimensional image is changed to a two-dimensional image through slices, the calculation is performed directly with three-dimensional data in the embodiment, which is faster and has better effect.

At block S102: expanding an edge of each image area to obtain a corresponding expanded area.

During the calculation of each image area, the edge of the image area is required to be expanded to ensure the denoising effect of the edge of the image area. The obtained expanded area includes the image area and an edge area, and the edge area includes pixels in other image areas adjacent to the image area.

Further referring to FIG. 2, in FIG. 2, the to-be-processed image is divided into multiple image areas $\Omega_0^k$, and an edge of each image area $\Omega_0^k$ is expanded to obtain an expanded area $\Omega_\delta^k$. The expanded area $\Omega_\delta^k$, includes the image area $\Omega_0^k$ and an edge area $\delta$. To facilitate understanding, in FIG. 2, the edge area $\delta$ only shows the expanded part of the lower edge of the image area. Of course, the expanded parts at the upper, left, and right edges are also an edge area. The edge area $\delta$ includes pixels in other adjacent image areas. That is, adjacent expanded areas overlap each other at least partially.

Specifically, in order to ensure that each pixel at the edge of the image area has a better denoising effect, each pixel at the edge is expanded. Therefore, the expansion in the embodiment is an expansion of the image area along the edge shape of the image area, to obtain the expanded area having the same shape as the image area. Specifically, the edge of the image area is expanded by a preset number of pixels, the preset number is greater than or equal to 1, and is further set to be less than or equal to 5. For example, in FIG. 2, the edge of the image area is expanded by 2 pixels.

The reason why the pixel at the edges has poor denoising effect is because the surrounding pixels are not considered in the calculation, while the contents of adjacent pixels in the image are generally related to each other. Therefore, in the embodiment, the image area is expanded and then calculated, and the number of associated pixels is not too large. In the embodiment, the number of expanded pixels may be set to 1-5. Of course, the more the number, the greater the computational burden. After an experimental verification, expansion with 2 pixels may be enough to achieve better calculation results and faster calculation speed.

At block S103: performing denoising processing on each expanded area through a preset algorithm to obtain a corresponding denoised expanded area.

After the image area is expanded, a preset algorithm is used to denoise the expanded area, that is, mathematical calculations are performed.

In a case where the image denoising is described in mathematical language, the details are as follows:

$$z(x)=u(x)+\varepsilon(x), x \in \Omega \subset \mathbb{R}^d (d=2,3)$$

where u(x) represents an ideal denoised image to be restored, z(x) represents the original observed to-be-processed image, ε(x) represents an image noise to be removed, and $x \in \Omega \subset \mathbb{R}^d$ (d=2,3) represents whether the image is a two-dimensional image or a three-dimensional image. The performing denoising processing on the to-be-processed image is to find the ideal denoised image u(x).

In the embodiment, an image denoising Rudin-Osher-Fatemi (ROF) model is established to solve the above-mentioned image denoising problem, and the model is specifically as follows:

$$\text{Find } u^k \in BV(\Omega_\delta^k)$$

$$\text{Such that } \min_{u^k \in BV(\Omega_\delta^k)} \left\{ \alpha \int_{\Omega_\delta^k} |\nabla u^k| d\Omega_\delta^k + \frac{1}{2} \|u^k - z^k\|_{L^2(\Omega_\delta^k)}^2 \right\}$$

where $z^k = z|_{\Omega_\delta^k}$ is sub-image data with noise on the expanded area $\Omega_\delta^k$.

Figure 4:
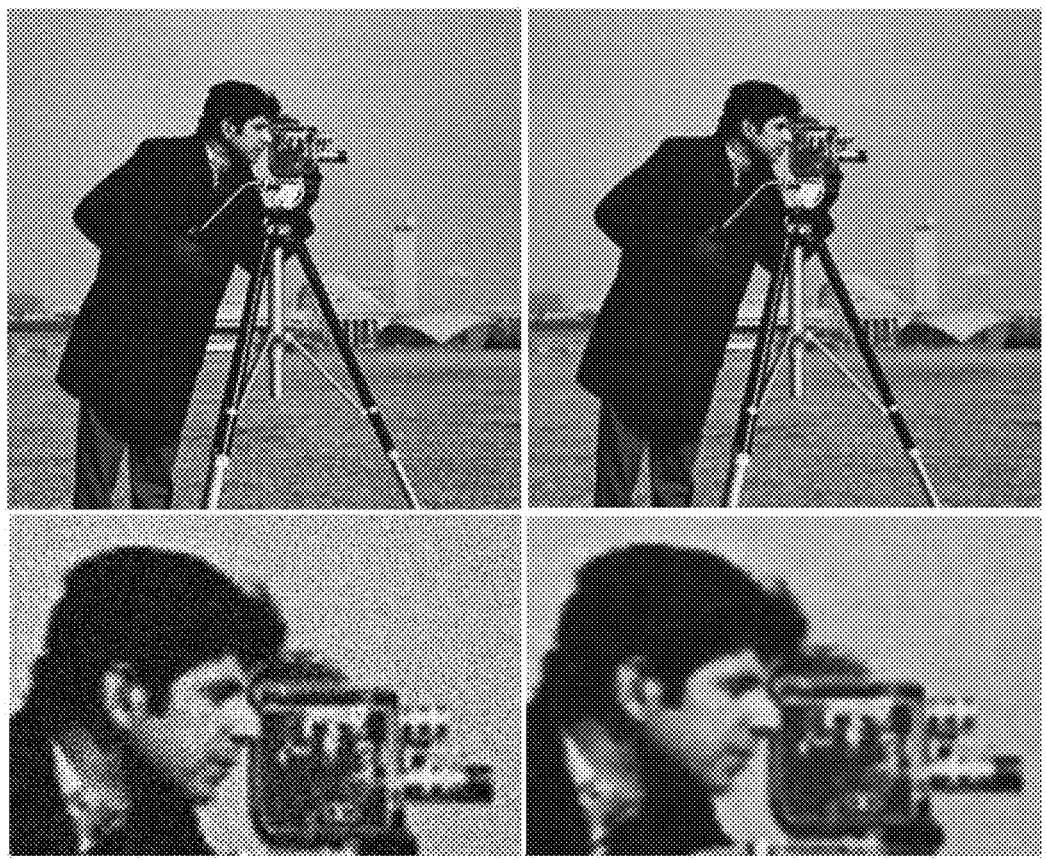
FIG. 4 is an effect view after denoising processing on an image through the method embodiment shown in FIG. 1.

The above ROF model may be converted into Euler-Lagrange equation form to facilitate solving.

$$\begin{cases} u^k - z^k - \alpha \nabla \cdot \left( \dfrac{\nabla u^k}{\sqrt{|\nabla u^k|^2 + \beta}} \right) = 0, & \text{in } \Omega_\delta^k, \\ \dfrac{\partial u^k}{\partial n} = 0, & \text{on } \partial \Omega_\delta^k, \end{cases}$$

where $\alpha$ is a positive parameter, and $\beta$ is also a positive parameter to avoid singularities when $|\nabla u^k|$ is 0. k represents a k-th area, and n represents an outer normal vector of the divided image area. In the embodiment, during specific calculations, $u^k$ is a pixel value of the k-th denoised image area, and $z^k$ is a pixel value of the k-th image area, that is, the original pixel value. The values of $\alpha$ and $\beta$ depend on the degree of desired denoising. When the degree of desired denoising is greater, the values of $\alpha$ and $\beta$ will be less, In the embodiment, the degree of denoising is expected to be greater, as shown in FIG. 4, where $\alpha=0.18$, $\beta=1.0\times 10^{-4}$.

For the above image denoising, a Newton-Krylov-Schwarz (NKS) algorithm may be used for calculation in the embodiment, and the specific process of the algorithm is as follows:

1. taking the image areas divided by the to-be-processed image as an initial image $u_0$.
2.1 building a Jacobian matrix $J_k$.
2.2 using a Krylov subspace method to fuzzy calculate the following right preconditions for the Jacobian system.

$$J_k M_k^{-1} M_k s_k = -F(u_k)$$

2.3 performing three times of line searching to determine a step size $T_k$.
2.4 $u_{k+1} = u_k + T_k s_k$.

iteratively performing the above 2.1-2.4, k=0, 1, . . . until convergence.

Among them, $F(u_0)=0$ represents a nonlinear system generated by the finite difference discretization of the following formula in the Euler-Lagrange equation above on a rectangular or hexahedral grid.

$$u^k - z^k - \alpha \nabla \cdot \left( \dfrac{\nabla u^k}{\sqrt{|\nabla u^k|^2 + \beta}} \right) = 0, \text{ in } \Omega_\delta^k$$

where $J_k$ represents the full Jacobian matrix of $F(u_k)$, and $M_k^{-1}$ represents an additional Schwarz preprocessing operator.

Fuzzy calculation means that the accuracy of Jacobian calculation depends on a parameter $\eta$, based on:

$$\|F(u_k) + J(u_k)s_k\| \leq \eta \|F(u_k)\|$$

In the calculation of the NKS algorithm, the number of divided image areas is equal to the number of solvers. The solvers are for incomplete LU decomposition. The relative remaining stopping conditions for a linear solver and a nonlinear solver are $10^{-4}$ and $10^{-6}$, respectively, and the overlap in the Schwarz preprocessing operator is set to 1.

In this operation, each expanded area is calculated to obtain a corresponding denoised expanded area, and the denoised expanded area includes a denoised image area and a denoised edge area.

At block S104: abandoning a denoised edge area in each denoised expanded area, and retaining and combining the denoised image areas to form a denoised image.

After calculating the above expanded area $\Omega_\delta^k$, the edge area part is removed, the image area part $\Omega_0^k$ is retained, and all the denoised image areas are combined to obtain the denoised image u. The mathematical calculation process is as follows:

$$u = \Sigma_{k=1}^N E_0^k R_0^k u^k$$

where $R_0^k$ is a restriction operator from the expanded area $\Omega_\delta^k$ to the image area $\Omega_0^k$. That is, the vector $u^k$ is defined in the expanded area $\Omega_\delta^k$, and $R_0^k u^k$ belongs to only the image area $\Omega_0^k$.

$E_0^k$ is an expansion operator from the image area $\Omega_0^k$ to the entire image $\Omega$. That is, m is defined as the number of pixels in the image $\Omega$, $m^k$ is the number of pixels in the expanded area $\Omega_\delta^k$, and $E_0^k$ is a $m \times m^k$ matrix. When the element $(E_0^k)_{i_1, i_2}$ in the matrix can correspond to a pixel in the image area, its value is 1; when the element $(E_0^k)_{i_1, i_2}$ in the matrix cannot correspond to a pixel in the image area, its value is 0.

In the image denoising method in the embodiments, a to-be-processed image is first divided into multiple image areas, reducing the calculation scale. The edge is expanded, and after the denoising calculation, the expanded edge area with poor denoising result is removed, effectively improving the denoising effect. Specifically, ROF model or NKS algorithm may be used for calculation. For large-scale images, efficient and fast calculation may be achieved.

When the above image denoising method is implemented in detail, a computer program is usually used to express its logical process, that is, each operation of the denoising method. In addition, a corresponding software system is constructed to implement the above denoising method based on hardware equipment.

Figure 5:
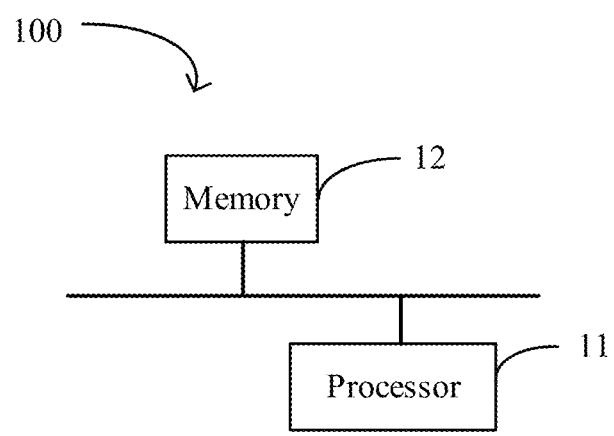
FIG. 5 is a structural schematic view of a denoising apparatus according to an embodiment of the present disclosure.

For hardware equipment, reference may be made to FIG. 5, which is a structural schematic view of a denoising apparatus according to an embodiment of the present disclosure. A denoising apparatus 100 includes a processor 11 and a memory 12, and a computer program is stored in the memory 12. The processor 11 can implement the above denoising method when the computer program is executed.

Figure 6:
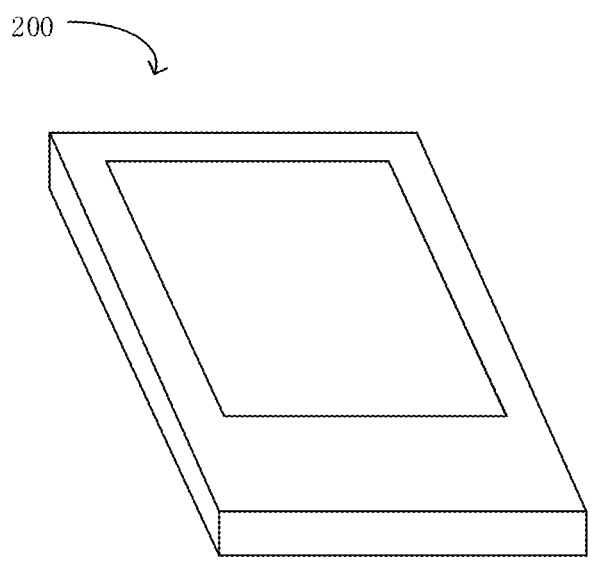
FIG. 6 is a structural schematic view of a computer-readable storage medium according to an embodiment of the present disclosure.

The computer program may be stored in a computer-readable storage medium. When the above image denoising method is implemented in the form of software and sold or used as an independent product, it can be stored in a readable storage medium of an electronic device. That is, the present disclosure further provides a computer-readable storage medium. Referring to FIG. 6. FIG. 6 is a structural schematic view of a computer-readable storage medium according to an embodiment of the present disclosure. A computer-readable storage medium 200 stores a computer program, and the computer program can be executed by a processor to implement operations of the above method. The computer-readable storage medium may be a U disk, an optical disk, a server, etc.

The above is only an embodiment of the present disclosure, and does not therefore limit the scope of the present disclosure. The equivalent structure or equivalent process transformation made by using the contents of specification and drawings in the present disclosure, or directly or indirectly applied to other related technical fields, is the same as included in the scope of the present disclosure.

What is claimed is:

1. A method for denoising an image, comprising:
   dividing one frame of to-be-processed image into a plurality of image areas;
   for each image area, expanding an edge of the image area to obtain an expanded area; wherein the expanded area comprises the image area and an edge area, and the edge area comprises pixels in another image area adjacent to the image area; wherein contents displayed by the pixels in the adjacent another image area are different from and are related to contents displayed by pixels in the image area;

for each expanded area, performing denoising processing on the expanded area through a preset algorithm to obtain a denoised expanded area; wherein the denoised expanded area comprises a denoised image area and a denoised edge area; and abandoning the denoised edge area in each denoised expanded area, and retaining and combining all the denoised image areas to form a denoised image.

2. The method according to claim 1, wherein for each image area, the expanding an edge of the image area to obtain an expanded area comprises:

expanding the image area along an edge shape of the image area to obtain the expanded area with the same shape as the image area.

3. The method according to claim 2, wherein the expanding the image area along an edge shape of the image area comprises:

expanding the edge of the image area with a preset number of pixels along the edge shape of the image area; wherein the preset number is greater than or equal to 1.

4. The method according to claim 1, wherein the dividing a to-be-processed image into a plurality of image areas comprises:

equally dividing the to-be-processed image into the plurality of image areas each in a rectangular shape.

5. The method according to claim 1, wherein in condition of the to-be-processed image being a three-dimensional image, the dividing a to-be-processed image into a plurality of image areas comprises:

dividing the to-be-processed image into the plurality of image areas according to three-dimensional coordinates of the to-be-processed image; wherein each image area is three-dimensional.

6. The method according to claim 1, wherein for each expanded area, the performing denoising processing on the expanded area through a preset algorithm comprises:

establishing an image denoising Rudin-Osher-Fatemi (ROF) model for the expanded area, and solving a Euler-Lagrange equation for the image denoising ROF model to denoise the expanded area;

wherein the Euler-Lagrange equation of the image denoising ROF model is as followed:

$$\begin{cases} u^k - z^k - \alpha \nabla \cdot \left( \dfrac{\nabla u^k}{\sqrt{|\nabla u^k|^2 + \beta}} \right) = 0, & \text{in } \Omega_\delta^k, \\ \dfrac{\partial u^k}{\partial n} = 0, & \text{on } \partial \Omega_\delta^k, \end{cases} ;$$

where $u^k$ is a pixel value of a k-th denoised image area, $z^k$ is a pixel value of a k-th image area, $\Omega_s^k$ is a k-th expanded area, and n is an outer normal vector of a corresponding image area; k is greater than or equal to 1 and less than or equal to n; $\alpha$ and $\beta$ are preset parameters.

7. The method according to claim 6, wherein values of $\alpha$ and $\beta$ depend on a desired denoising degree; the greater the desired denoising degree, the less the values of $\alpha$ and $\beta$.

8. The method according to claim 1, wherein for each expanded area, the performing denoising processing on the expanded area through a preset algorithm comprises:

applying a Newton-Krylov-Schwarz (NKS) algorithm to denoise the expanded area.

9. An apparatus for denoising an image, comprising a memory, a processor, and a computer program stored in the memory and executable by the processor; wherein the processor is capable of executing the computer program to implement:

dividing one frame of to-be-processed image into a plurality of image areas;

for each image area, expanding an edge of the image area to obtain an expanded area; wherein the expanded area comprises the image area and an edge area, and the edge area comprises pixels in another image area adjacent to the image area; wherein contents displayed by the pixels in the adjacent another image area are different from and are related to contents displayed by pixels in the image area;

for each expanded area, performing denoising processing on the expanded area through a preset algorithm to obtain a denoised expanded area; wherein the denoised expanded area comprises a denoised image area and a denoised edge area; and abandoning the denoised edge area in each denoised expanded area, and retaining and combining all the denoised image areas to form a denoised image.

10. The apparatus according to claim 9, wherein for each image area, the expanding an edge of the image area to obtain an expanded area comprises:

expanding the image area along an edge shape of the image area to obtain the expanded area with the same shape as the image area.

11. The apparatus according to claim 10, wherein the expanding the image area along an edge shape of the image area comprises:

expanding the edge of the image area with a preset number of pixels along the edge shape of the image area; wherein the preset number is greater than or equal to 1.

12. The apparatus according to claim 9, wherein the dividing a to-be-processed image into a plurality of image areas comprises:

equally dividing the to-be-processed image into the plurality of image areas each in a rectangular shape.

13. The apparatus according to claim 9, wherein in condition of the to-be-processed image being a three-dimensional image, the dividing a to-be-processed image into a plurality of image areas comprises:

dividing the to-be-processed image into the plurality of image areas according to three-dimensional coordinates of the to-be-processed image; wherein each image area is three-dimensional.

14. The apparatus according to claim 9, wherein for each expanded area, the performing denoising processing on the expanded area through a preset algorithm comprises:

establishing an image denoising Rudin-Osher-Fatemi (ROF) model for the expanded area, and solving a Euler-Lagrange equation for the image denoising ROF model to denoise the expanded area;

wherein the Euler-Lagrange equation of the image denoising ROF model is as followed:

$$\begin{cases} u^k - z^k - \alpha \nabla \cdot \left( \dfrac{\nabla u^k}{\sqrt{|\nabla u^k|^2 + \beta}} \right) = 0, & \text{in } \Omega_\delta^k, \\ \dfrac{\partial u^k}{\partial n} = 0, & \text{on } \partial \Omega_\delta^k, \end{cases}$$

where $u^k$ is a pixel value of a k-th denoised image area, $z^k$ is a pixel value of a k-th image area, $\Omega_\delta^k$ is a k-th expanded area, and n is an outer normal vector of a corresponding image area; k is greater than or equal to 1 and less than or equal to n; $\alpha$ and $\beta$ are preset parameters.

15. The apparatus according to claim 14, wherein values of $\alpha$ and $\beta$ depend on a desired denoising degree; the greater the desired denoising degree, the less the values of $\alpha$ and $\beta$.

16. The apparatus according to claim 9, wherein for each expanded area, the performing denoising processing on the expanded area through a preset algorithm comprises:
applying a Newton-Krylov-Schwarz (NKS) algorithm to denoise the expanded area.

17. A non-transitory computer-readable storage medium, storing a computer program; wherein the computer program is executable by a processor to implement:
dividing one frame of to-be-processed image into a plurality of image areas;
for each image area, expanding an edge of the image area to obtain an expanded area; wherein the expanded area comprises the image area and an edge area, and the edge area comprises pixels in another image area adjacent to the image area; wherein contents displayed by the pixels in the adjacent another image area are different from and are related to contents displayed by pixels in the image area;
for each expanded area, performing denoising processing on the expanded area through a preset algorithm to obtain a denoised expanded area; wherein the denoised expanded area comprises a denoised image area and a denoised edge area; and
abandoning the denoised edge area in each denoised expanded area, and retaining and combining all the denoised image areas to form a denoised image.

18. The non-transitory computer-readable storage medium according to claim 17, wherein for each image area, the expanding an edge of the image area to obtain an expanded area comprises:
expanding the image area along an edge shape of the image area to obtain the expanded area with the same shape as the image area.

19. The non-transitory computer-readable storage medium according to claim 17, wherein for each expanded area, the performing denoising processing on the expanded area through a preset algorithm comprises:
establishing an image denoising Rudin-Osher-Fatemi (ROF) model for the expanded area, and solving a Euler-Lagrange equation for the image denoising ROF model to denoise the expanded area;
wherein the Euler-Lagrange equation of the image denoising ROF model is as followed:

$$\begin{cases} u^k - z^k - \alpha \nabla \cdot \left( \dfrac{\nabla u^k}{\sqrt{|\nabla u^k|^2 + \beta}} \right) = 0, \text{ in } \Omega_\delta^k, \\ \dfrac{\partial u^k}{\partial n} = 0, \text{ on } \partial \Omega_\delta^k, \end{cases}$$

where $u^k$ is a pixel value of a k-th denoised image area, $z^k$ is a pixel value of a k-th image area, $\Omega_\delta^k$ is a k-th expanded area, and n is an outer normal vector of a corresponding image area; k is greater than or equal to 1 and less than or equal to n; $\alpha$ and $\beta$ are preset parameters.

20. The non-transitory computer-readable storage medium according to claim 19, wherein values of $\alpha$ and $\beta$ depend on a desired denoising degree; the greater the desired denoising degree, the less the values of $\alpha$ and $\beta$.

* * * * *